United States Patent Office 3,686,192
Patented Aug. 22, 1972

3,686,192
SUBSTITUTED PYRIDINE DERIVATIVES
George G. I. Moore, Birchwood, Joseph Kenneth Harrington, Edina, and John F. Gerster, Woodbury, Minn., assignors to Minnesota Mining and Manufacturing Company, St. Paul, Minn.
No Drawing. Filed Jan. 4, 1971, Ser. No. 103,795
Int. Cl. C07d 31/48
U.S. Cl. 260—294.8 F    11 Claims

ABSTRACT OF THE DISCLOSURE

Compounds wherein a pyridine ring and a benzene ring are linked by sulfur, oxygen, imino, carbonyl or a carbon-carbon bond and one of the rings is substituted by a haloalkylsulfonamido group. The rings are optionally substituted by lower alkyl, lower alkoxy, hydroxy and/or halogen. These compounds and their salts are active as plant growth modifying agents.

---

This invention relates to compounds wherein a pyridine ring and a benzene ring are linked by sulfur, oxygen, imino, carbonyl or a carbon-carbon bond, and one of the rings is substituted by a haloalkylsulfonamido group, and to salts thereof. The rings are optionally substituted by lower alkyl, lower alkoxy, hydroxy and/or halogen. The compounds of the invention are active as plant growth modifying agents and some are also anti-inflammatory and anti-microbial agents.

It is an object of the invention to provide compounds which modify the growth of plants, i.e. which prevent, alter, destroy or otherwise affect the growth of plants.

It is an object of the invention to provide compounds which are anti-inflammatory agents.

It is an object of the invention to provide compounds which are anti-microbial agents.

It is a further object of the invention to provide a method for controlling unwanted plants.

It is a further object of the invention to provide a method for controlling inflammation in mammalian tissue.

It is a further object of the invention to provide a method for the control of microorganisms.

It is still another object of the invention to provide plant growth modifying compositions containing one or more pyridine derivatives as active ingredients therein.

It is still another object of the invention to provide anti-inflammatory compositions containing one or more pyridine derivatives as active ingredients therein.

It is still another object of the invention to provide anti-microbial compositions containing one or more pyridine derivatives as active ingredients therein.

Still other objects will be made apparent by the following specification.

DETAILED DESCRIPTION

According to the present invention there is provided a class of compounds of the formula $$R_xSO_2N(R)-Ar(Y)-Z-Ar'(Y') \quad\quad I$$

wherein $R_x$ is a haloalkyl group containing one to four carbon atoms, R is hydrogen or a horticulturally acceptable cation, one of Ar and Ar' is a pyridine ring and the other is a benzene ring, Z is —O—, —S—, —NH—, $$-\overset{O}{\underset{\|}{C}}-$$

or a carbon-carbon bond and Y and Y' are independently chosen from hydrogen, lower alkyl, lower alkoxy, halogen and hydroxy.

$R_x$ can be a straight or branched chain fully-halogenated alkyl group (perhaloalkyl) or a partially-halogenated alkyl group. The haloalkyl groups may contain bromine or iodine, but preferably contain only fluorine and/or chlorine. Preferably $R_x$ contains one carbon atom. Preferably, also, there are at least two halogen atoms bonded to the carbon of the radical $R_x$ which is alpha to the sulfonyl group. Compounds wherein $R_x$ is perhalomethyl, particularly trifluoromethyl, are most preferred because of their greater activity as plant growth modifying (especially herbicidal) agents.

The compounds of the invention in which R is hydrogen are acidic in nature and are sometimes referred to herein as the acid form compounds. They form salts, i.e. compounds of Formula I wherein R is a horticulturally acceptable cation. These are generally alkali metal (e.g. lithium, sodium and potassium), alkaline earth metal (e.g. barium, calcium and magnesium), other metal (e.g. aluminum, zinc and iron), ammonium and amine salts. Salts of these types are suitable for use as anti-inflammatory and anti-microbial agents as well as plant growth modifying (especially herbicidal) agents when the corresponding acid form compounds are active in those areas. In such instances, salts of the ions set forth above are also pharmaceutically acceptable and agriculturally acceptable. The particular salt chosen in any instance depends upon the particular use and upon the economics of the situation.

The amine salts include the salts of aliphatic (e.g. alkyl), aromatic and heterocyclic amines, as well as those having a mixture of these types of structures. The amines useful in preparing the salts of the invention can be primary, secondary or tertiary and preferably contain not more than 20 carbon atoms.

The Y and Y' groups can be the same or different and preferably contain not more than one carbon atom. The term "lower" when used herein with respect to Y or Y', or otherwise, refers to groups containing from one to four atoms.

The acid form compounds of the invention are generally prepared by the reaction of a haloalkanesulfonyl halide or anhydride with a primary arylamine as shown in the following equation $$R_xSO_2Q + NH_2-Ar(Y)-Z-Ar'(Y') \longrightarrow R_xSO_2N(H)-Ar(Y)-Z-Ar'(Y') + HQ$$

II    I wherein $R_x$, Ar, Ar' and Z are as previously defined and Q is halogen or a haloalkansulfonate group ($R_xSO_2O-$). Compounds of the invention wherein $R_x$ is a partially halogenated alkyl radical are preferably prepared by use of the corresponding haloalkanesulfonyl chloride. Compounds of the invention wherein $R_x$ is a perfluoroalkyl radical are preferably prepared by reaction of the corresponding perfluoroalkanesulfonyl fluoride in a pressure reactor.

Approximately equivalent amounts of the reactants are brought together at temperatures most often ranging between −15 and 150° C. If necessary or desirable the reaction can be carried out in a pressure vessel. The reaction is preferably, but not necessarily, carried out in the presence of an acid acceptor such as an organic (preferably) or inorganic base. Bases such as tertiary amines, e.g. pyridine, triethylamine and N,N-dimethylaniline and alkaline earth or alkali metal carbonates, bicarbonates, acetates and the like are suitable as acid acceptors. The amount of acid acceptor can be varied widely; however, a 10 mole percent excess of that amount of base sufficient to bind the liberated strong acid (HQ) is routinely employed.

A solution of the appropriate primary arylamine and an equimolar quantity of acid acceptor in an inert organic solvent is ordinarily used to carry out the condensation. An excess of the aromatic primary amine may also serve as the acid acceptor, but that is not a preferred procedure. Among the suitable solvents are 1,2-dimethoxyethane, benzene, toluene, acetonitrile, chloroform, dichloromethane, dimethylacetamide, dimethylformamide and the like. Alternatively, an excess of an organic amine acid acceptor may serve as solvent in some instances.

After reaction is complete, if the reaction solvent is not water miscible, the product mixture can be extracted with a dilute aqueous base solution. The product is usually soluble in the basic aqueous layer and is precipitated therefrom by careful addition of a mineral acid such as hydrochloric or sulfuric acid, and collected by filtration.

If the reaction solvent is water miscible, the product is generally obtained by dilution of the reaction mixture with water. The product, a solid or oil, is separated and purified by conventional methods. The compounds prepared according to the foregoing procedures are crystalline solids and are purified, in general, by recrystallization from aqueous alcohol, trichloroethylene, hexane, benzene-hexane mixtures and the like. Sublimation and elution chromatography have also been found to be useful purification techniques.

The intermediate primary arylamines used to prepare compounds of the invention wherein Z is carbonyl are known or are conveniently prepared by nitration of known benzoylpyridines, followed by catalytic reduction of the nitro group therein. The mononitration is effected readily with a mixture of fuming nitric and sulfuric acids at about 50° C., using concentrated sulfuric acid as a solvent. The reduction of the nitro group can be carried out using conventional reduction methods. One method which has been generally useful is catalytic reduction with palladium on charcoal in ethanol.

Known intermediate compounds of these types in which the nitro or amino group is bonded to the benzene ring are the following:

4-chloro-2-picolinoylaniline
4-isonicotinoylnitrobenzene
4-picolinoylnitrobenzene
2-nicotinoylnitrobenzene
2-nicotinoylaniline
3-picolinoylnitrobenzene
2-isonicotinoylaniline
4-chloro-3-nicotinoylnitrobenzene
3-isonicotinoylnitrobenzene
4-nitro-2-picolinoylaniline Known intermediate compounds in which the nitro or amino group is on the pyridine ring include the following 2-amino-3-benzoylpyridine
4-amino-3-benzoylpyridine
3-amino-2-benzoylpyridine
3-amino-4-benzoylpyridine Where Z is oxygen, imino or sulfur the intermediate primary arylamines are prepared by known methods from known starting materials. One useful method is reaction of a nitrohalopyridine with a metal salt of the corresponding benzene derivative, as illustrated in the following equation:

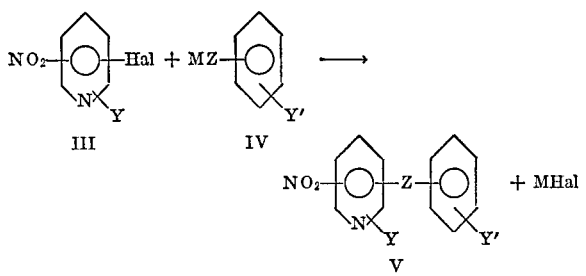

wherein M is a metal such as sodium, potassium, copper and the like, Z is oxygen, imino or sulfur, Hal is halogen, preferably chlorine or bromine, and Y and Y' are as previously defined. The nitro compounds are readily reduced by catalytic or chemical methods, e.g. Raney nickel, to the desired primary arylamines. Another useful method is reaction of dihalopyridines with one mole of a compound of Formula IV followed by displacement of the second halogen by ammonia.

Intermediate primary arylamines wherein Z is a carbon-carbon bond are generally well-known in the art.

Compounds of the invention in which the Y and Y' groups are alkoxide and hydroxyl can be prepared from analagous compounds of the invention in which Y and Y' are respectively halogen and alkoxide using well-known synthetic organic techniques. Thus, activated halogen atoms may be replaced by alkoxide groups by reacting the halo-substituted compound with a suitable alkali metal alkoxide in a solvent such as dimethylformamide. Compounds of the invention wherein Y or Y' is hydroxyl are prepared preferably by ether cleavage of the corresponding alkoxy-substituted compounds of the invention. This has generally been done using hydrogen iodide in acetic acid, a technique well-known in the chemical art.

The salts of the invention can be prepared by treating the acid form with a stoichiometrically equivalent amount of an appropriate base under mild conditions in inert solvent solution (aqueous or non-aqueous). The resulting solution is treated to remove the solvent, e.g. by evaporation under reduced pressure, to obtain the salt, usually as a dry powder. The appropriate bases for use in preparing the metal salts include metal oxides, carbonates, hydroxides, bicarbonates and alkoxides. The organic amine salts and the ammonium salts can be prepared by reacting the acid form with the appropriate organic base or ammonium hydroxide. Some salts are also prepared by cation exchange reactions (by reacting a salt of the invention with an organic or inorganic salt in a cation exchange reaction). Since many of the salts are water soluble, they are often used in the form of aqueous solutions.

As noted previously, the compounds of the invention have several areas of utility. They are generally useful as plant growth modifiers, particularly as herbicides, as determined by standard screening methods against various weed species. Those compounds in which the haloalkylsulfonamido group is a substituent on the benzene ring and Y and Y' are both hydrogen are active anti-inflammatory agents and those in which Z is —S—, the haloalkylsulfonamido group is ortho or para oriented with respect to Z and Y and Y' are other than hydroxy are active antimicrobials. Also, those compounds in which Z is —O— and the haloalkylsulfonamido group is ortho or para oriented on the benzene ring are active anti-microbials.

The herbicidal activity of representative compounds of the invention has been determined using screening tests against experimental plantings. The following weed mixtures are used for the tests.

Grasses:
  Giant foxtail (*Setaria faberii*)
  Barnyard grass (*Echinochloa crusgalli*)
  Crabgrass (*Digitaria ischaemum*)
  Quackgrass (*Agropyron repens*)
  Wild oats (*Avena fatua*)

Broadleaves:
  Pigweed (*Amaranthus retroflexus*)
  Purslane (*Portulaca oleracea*)
  Wild mustard (*Brassica kaber*)
  Yellow rocket (*Barbarea vulgaris*)
  Curly dock (*Rumex crispus*)

The test chemicals are dissolved in a small amount of acetone or other suitable solvent then diluted with water to give a concentration of 2,000 p.p.m. From this concentration aliquots are diluted to give a final concentration of 500 or 1,000 p.p.m. 80 ml. of this solution are added to a 6 inch pot containing the weed seeds to give a concentration equivalent to 20 or 40 pounds per acre.

All subsequent waterings are made from the bottom. Two pots are used per treatment. Data are taken two to three weeks after treatment and recorded as percent pre-emergence kill for each species compared to the untreated controls.

To assess post-emergence activity, the same weed mixtures are allowed to grow from two to three weeks until the grasses are approximately one to three inches and broadleaves 1½ inches tall. They are sprayed for approximately ten seconds or until good wetting of the leaf surfaces occurs with a 2,000 p.p.m. solution as described above.

Data are taken two to three weeks after treatment and recorded as percent kill for each species compared to the untreated controls.

The following compounds of the invention are preferred because of their good herbicidal activity at 20 pounds per acre or 2,000 p.p.m. or less:

3-(3-pyridyloxy)trifluoromethanesulfonanilide
2-phenylthio-3-trifluoromethylsulfonamidopyridine
5-chloro-2-(2-pyridyloxy)trifluoromethanesulfonanilide
3-(2-pyridylthio)trifluoromethanesulfonanilide Although all of the compounds of the invention are active as herbicides, it will be appreciated that some are more active than others.

In order to control unwanted plants the compounds of the invention can be used alone as herbicides, for example as dusts or granules of the compounds, or preferably they may be applied in formulations. Formulations are comprised of the active ingredient and one or more herbicidal adjuvants and/or carriers. Formulations are useful to facilitate the application of the compound and to achieve specific biological objectives such as controlling the availability of the herbicide, improving adherence to plants, and the like, as is well-known to those skilled in the art. Thus, spreading agents, wetting agents, sticking agents or other adjuvants can be added as desired. Dry powders, as such or diluted with inert materials such diatomaceous earth, can likewise be used for this purpose. The preparations are coated on the plants or the ground is covered when pre-emergence control is desired. Application is made with the usual sprayers, dust guns and the like. The rate of application will, of course, vary but the preferred compounds of the invention exhibit satisfactory control of many weed species at the application of about 0.5 to 20 pounds per acre. It is, of course, to be expected that local conditions, for example, temperature, humidity, moisture content of the soil, nature of the soil and the like, may require greater or smaller amounts.

As noted previously, many of the compounds of the present invention are also active as anti-inflammatory and anti-microbial agents, although these activities vary among the compounds. The anti-inflammatory activity can be conveniently demonstrated using assays designed to test the ability of these compounds to antagonize local edema, which is a characteristic of the anti-inflammatory response (rat foot edema test), and to inhibit the onset of the erythematous manifestation of inflammation (guinea pig erythema test).

These are standard assays well-known to those skilled in the art. They are described in journals and other publications. Leading references to the rat foot edema test are:

(1) Adamkiewica et al., Canad. J. Biochem. Physic. 33:332, 1955;
(2) Selye, Brit. Med. J. 2:1129, 1949; and
(3) Winter, Proc. Soc. Exper. Biol. Med. 111:544, 1962.

Leading references to the guinea pig erythema test are:

(1) Wilhelmi, Schweiz. Md. Wschr. 79:577, 1949, and
(2) Winder et al., Arch. Int. Pharmacodyn. 116:261, 1958.

The anti-inflammatory activity of various compounds of the invention may be detected by other standard assays known to the art such as the cotton pellet granuloma and adjuvant arthritis tests.

The compounds are administered orally, for example as four percent acacia suspensions, but may also be administered parenterally. Amounts are generally about 1 to 500 mg./kg. of body weight of the mammal to be treated.

In the rate foot edema test and/or the guinea pig erythema test the following compounds have been found to be particularly effective anti-inflammatory agents at dosage levels of less than 100 mg./kg. in single doses:

3-(3-pyridyloxy)trifluoromethanesulfonanilide
2-anilino-3-trifluoromethylsulfonamidopyridine
2-phenoxy-3-trifluoromethylsulfonamidopyridine
3-(2-pyridyloxy)trifluoromethanesulfonanilide
2-phenylthio-3-trifluoromethylsulfonamidopyridine
3-picolinoyldifluoromethanesulfonanilide
3-picolinoyltrifluoromethanesulfonanilide
3-(2-pyridylthio)trifluoromethanesulfonanilide The anti-microbial activity of the compounds of the invention has been evaluated using a variation of the original agar-plate diffusion method of Vincent and Vincent (e.g., see Vincent, J. G., and Vincent, Helen W., Proc. Soc. Exptl. Biol. Med. 55:162–164, 1944, and Davis, B. D., and Mingioli, E. S., Jour. Bact. 66:129–136, 1953).

The following examples are given for the purpose of further illustrating the procedures of the present invention, but are not intended, in any way, to be limiting on the scope thereof. Thus, while the majority of examples relate to compounds in which $R_x$ contains but a single carbon atom, other haloalkyl groups can be substituted in place thereof. Also, although the examples relate for the most part to compounds in the acid form, it is understood that the salts are likewise contemplated. In addition, the rings could be substituted by lower alkyl and lower alkoxy groups other than methyl and methoxy although the examples are largely limited to the latter groups.

All melting points in the examples are given in degrees centigrade and are uncorrected.

The intermediate compounds of the formula

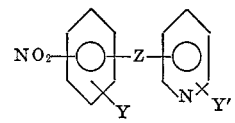

can be prepared by known methods from known starting materials. One useful method is reaction of a halopyridine with a metal salt of the corresponding nitrobenzene derivative in a manner analogous to the preparation of the compounds V as shown previously.

EXAMPLE 1

A solution of 3-picolinoylaniline (9.5 g., 0.048 mole) and dimethylaniline (7.26 g., 0.060 mole) in chloroform (200 ml.) is treated dropwise with trifluoromethane-sulfonic anhydride (14.1 g., 0.050 mole). The resulting solution is stirred one day. This solution is extracted with dilute sodium hydroxide. The alkaline extracts are washed with chloroform, treated with decolorizing charcoal, then acidified to pH 4 with 1.0 N hydrochloric acid. On cooling 3-picolinoyltrifluoromethanesulfonanilide is obtained. Recrystallization from an ethanol-water mixture and treatment wtih decolorizing charcoal gives pure solid product, M.P. 159–161° C.

Analysis.—Calculated for $C_{13}H_9F_3N_2O_3S$ (percent): C, 47.25; H, 2.75; N, 8.5. Found (percent): C, 47.4; H, 2.9; N, 8.5.

EXAMPLE 2

A solution of 3-(3-pyridinyloxy)aniline (12.7 g., 0.068 mole) benzene (10 ml.) and triethylamine (45 ml.) is placed in a pressure reactor and trifluoromethanesulfonyl fluoride (10.7 g., 0.070 mole) is added to the reactor. The reactor is heated for one day at 94° C. The reaction mixture is evaporated in vacuo to give an oil which is heated on a steam bath with an excess of the amount of sodium hydroxide theroretically required to neutralize the product. Steam distillation is used to remove the triethylamine. The solution is acidified with hydrochloric acid to pH 5 to give a solid product which is dissolved in dichloromethane (500 ml.) and the solution is dried. The solvent is removed in vacuo to give a solid which is recrystallized thrice from benzene-trichloroethylene mixture, twice treating with decolorizing charcoal. The white needles are washed with about 15 ml. of dichloromethane and recrystallized from benzene-hexane to give 3-(3-pyridyloxy)trifluoromethanesulfonanilide, M.P. 127.5–130° C.

*Analysis.*—Calculated for $C_{12}H_9F_3N_2O_3S$ (percent): C, 45.2; H, 2.8; N, 8.8. Found (percent): C, 45.2; H, 2.7; N, 8.9.

The following compounds are prepared using the general procedure as described specifically in Example 2.

| Ex. No. | Compound | Melting point (° C.) |
|---|---|---|
| 3 | 2-anilino-3-trifluoromethylsulfonamidopyridine | 228.5–230.5 |
| 4 | 2-phenoxy-3-trifluoromethylsulfonamidopyridine | 166.5–169.5 |
| 5 | 2-phenoxy-5-trifluoromethylsulfonamidopyridine | 94–96 |
| 6 | 5-chloro-2-(3-pyridyloxy)trifluoromethanesulfonanilide | 196.5–197.5 |
| 7 | 3-(2-pyridyloxy)trifluoromethanesulfonanilide | 145.5–147.5 |
| 8 | 2-phenylthio-6-trifluoromethylsulfonamidopyridine | 153.5–155 |
| 9 | 2-phenylthio-3-trifluoromethylsulfonamidopyridine | 175.5–176.5 |
| 10 | 2-phenoxy-6-trifluoromethylsulfonamidopyridine | 126–127.5 |
| 11 | N-(2'-phenyl-3-pyridyl)trifluoromethanesulfonamide | 168.5–170.5 |
| 12 | N-(4'-phenyl-2-pyridyl)trifluoromethanesulfonamide | >290 |
| 13 | 3-(2-pyridylthio)trifluoromethanesulfonanilide | 119.5–121 |
| 14 | 2-anilino-5-trifluoromethylsulfonamidopyridine | 200–201 |
| 15 | 6-methoxy-2-phenoxy-3-trifluoromethylsulfonamidopyridine | 111–112.5 |
| 16 | 5-chloro-2-(2-pyridyloxy)trifluoromethanesulfonanilide | 127.5–129 |
| 17 | 3-(3-pyridylthio)trifluoromethanesulfonanilide | 123–125 |
| 18 | 6-methoxy-2-phenylthiotrifluoromethanesulfonanilide | 106.5–108 |
| 19 | 4-phenoxy-3-trifluoromethylsulfonamidopyridine | 260–262 |
| 20 | 4-phenylthio-3-trifluoromethylsulfonamidopyridine | 271–273 |
| 21 | 3-isonicotinoyltrifluoromethanesulfonanilide | 153–158 |
| 22 | 5-phenoxy-2-trifluoromethylsulfonamidopyridine | 186.5–190.5 |
| 23 | 3-(6-chloro-2-pyridylthio)trifluoromethanesulfonanilide | 119–120.5 |
| 24 | 3-(4-methyl-2-pyridylthio)trifluoromethanesulfonanilide | 113–115.5 |

EXAMPLE 25

Acetic acid (50 ml.) and 6-methoxy-2-phenoxy-3-trifluoromethylsulfonamidopyridine (5.9 g., 0.017 mole) are mixed and hydriodic acid (26 ml., 0.35 mole) is added. The mixture is heated to reflux and maintained at this temperature overnight. Cold water and dichloromethane are added and mixed, and the layers are separated. Sodium thiosulfate (25 g.) is added to the organic layer. The organic layer is washed with water, then dried over magnesium sulfate. The solvent is removed in vacuo to give a solid residue which is recrystallized and treated with decolorizing charcoal twice from a benzene-hexane mixture. The 6-hydroxy-2-phenoxy-3-trifluoromethylsulfonamidopyridine is obtained as brown crystals, M.P. 145–146.5° C.

*Analysis.*—Calculated for $C_{12}H_9F_3N_2O_4S$ (percent): C, 43.1; H, 2.7; N, 8.4. Found (percent): C, 43.1; H, 2.8; N, 8.3.

EXAMPLE 26

Using the procedure of Example 25, 6-methoxy-2-phenylthio-5-trifluoromethylsulfonamidopyridine is converted to 6-hydroxy-2-phenylthio-5-trifluoromethylsulfonamidopyridine, M.P. 195–198° C. (dec.).

EXAMPLE 27

Using the procedure of Example 25, 3-(6-methoxy-2-pyridylthio)trifluoromethanesulfonanilide is converted to 3 - (6 - hydroxy-2-pyridyl)trifluoromethanesulfonanilide, M.P. 200.5–202.5° C.

EXAMPLE 28

3-Picolinoylaniline (5.0 g., 25 mmole) is added to a solution of N,N-dimethylaniline (3.0 g., 25 mmole) in chloroform (85 ml.), and the mixture is cooled to 0° C. Difluoromethanesulfonyl chloride (3.8 g., 25 mmole) is added dropwise while maintaining the reaction temperature below 5° C. The mixture is then stirred at room temperature for one day, then heated to reflux temperature and maintained at that temperature for two hours. The mixture is evaporated in vacuo, then the residue is extracted with excess 5 percent sodium hydroxide solution. This basic solution is extracted with chloroform, then hexane. The basic solution is then acidified with glacial acetic acid. The solid product is collected by filtration, then recrystallized from an ethanol-water mixture to yield 3-picolinoyldifluoromethanesulfonanilide, M.P. 141–144° C.

*Analysis.*—Calculated for $C_{13}H_{10}F_2N_2O_3S$ (percent): C, 50.0; H, 3.2; N, 9.0. Found (percent): C, 50.0; H, 3.3; N, 8.9.

Using the general procedure described specifically in Example 28 and the corresponding primary arylamines, the following exemplary compounds of the invention are obtained.

| Ex. No. | Compound | Meltint poing (° C.) |
|---|---|---|
| 29 | 3-(2-pyridylthio)difluoromethanesulfonanilide | 105.5–107 |
| 30 | 3-isonicotinoyldifluoromethanesulfonanilide | 165–169 |

EXAMPLE 31

Trifluoromethanesulfonyl fluoride (8.6 g.), 3-(6-chloro-2-pyridyloxy)aniline (12.5 g., 57 mmole), triethylamine (24 ml.) and benzene (about 15 ml.) are heated for 24 hours at 90° C. The reaction mixture is evaporated in vacuo to give a residue which is heated on a steam bath with an excess of the amount of sodium hydroxide which is theoretically required to neutralize the product. The mixture is filtered, then acidified carefully. The red-brown oil is separated and purified partially by column chromatography on acid alumina. The first fractions, eluted by benzene, are recrystallized from a benzene-hexane mixture, then converted to the triethylamine salt by reaction with a slight excess of triethylamine in diethyl ether. The solid produce is recrystallized from an isopropyl alcohol-diisopropyl ether mixture to give rods of triethylammonium 3 - (6 - chloro-2-pyridyloxy)trifluoromethanesulfonanilide, M.P. 61.5–64° C.

*Analysis.*—Calculated for $C_{18}H_{23}ClF_3N_3O_3S$ (percent): C, 47.6; H, 5.1. Found (percent): C, 47.7; H, 5.0.

EXAMPLE 32

To a solution of sodium methoxide (5.4 g., 0.10 mole) in dimethylformamide (250 ml.) is added 3-(6-chloro-2-pyridylthio)trifluoromethanesulfonanilide (18.3 g., 0.050 mole) and the mixture is stirred and heated at 100° C. overnight. The mixture is filtered and evaporated in vacuo. The residue is poured into water, then the solution is extracted with dichloromethane. The extracts are dried over magnesium sulfate, filtered, then the solvent is evaporated in vacuo. Residual dimethylformamide is removed by distillation and the product crystallizes after scratching Recrystallization from benzene with treatment with decolorizing charcoal is followed by sublimation and a second recrystallization from benzene. White crystals are obtained of 3-(6-methoxy-2-pyridylthio)trifluoromethanesulfonanilide, M.P. 193–105° C.

Other compounds exemplary of the invention are given in Table I.

TABLE I

| Example No. | Compound |
|---|---|
| 33 | 3-(2-pyridylthio)perfluoroethanesulfonanilide. |
| 34 | 3-(6-fluoro-2-pyridylthio)difluorochloromethanesulfonanilide. |
| 35 | 3-(3-ethoxy-2-pyridyloxy)perfluorobutanesulfonanilide. |
| 36 | 3-(6-bromo-2-pyridylthio)trifluoromethanesulfonanilide. |

What is claimed is:
1. A compound of the formula

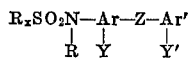

wherein $R_x$ is haloalkyl group containing from one to four carbon atoms, R is hydrogen or a horticulturally acceptable cation, one of Ar and Ar' is a pyridine ring and the other is a benzene ring, Z is —O—, —S—, —NH—,

or a carbon-carbon bond and Y and Y' are independently chosen from hydrogen, lower alkyl, lower alkoxy, halogen and hydroxy.

2. A compound according to claim 1 wherein $R_x$ is perhalomethyl.

3. A compound according to claim 2 wherein $R_x$ is trifluoromethyl.

4. A compound according to claim 1 wherein $R_x$ is difluoromethyl.

5. A compound according to claim 1 wherein R is hydrogen.

6. A compound according to claim 1 wherein Y and Y' contain not more than one carbon atom each.

7. A compound according to claim 6 wherein Y and Y' are hydrogen.

8. 3-(3 - pyridyloxy)trifluoromethanesulfonanilide according to claim 3.

9. 2-phenylthio - 3 - trifluoromethylsulfonamidopyridine according to claim 3.

10. 5-chloro-2-(2 - pyridyloxy)trifluoromethanesulfonanilide according to claim 3.

11. 3 - (2 - pyridylthio)trifluoromethanesulfonanilide according to claim 3.

References Cited
FOREIGN PATENTS
1,579,473   7/1969   France _____ 260—294.8 F

HENRY R. JILES, Primary Examiner
R. T. BOND, Assistant Examiner

U.S. Cl. X.R.
424—263